(12) United States Patent
Davis et al.

(10) Patent No.: US 6,917,890 B2
(45) Date of Patent: Jul. 12, 2005

(54) METHOD TO PROVIDE OFF-LINE TRANSFER OF VEHICLE CALIBRATION DATA

(75) Inventors: J. Roger Davis, Russiaville, IN (US);
Jill G. Hersberger, Kokomo, IN (US);
Linda L. Miner, Kokomo, IN (US); R. Clarkson Griffin, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/447,375

(22) Filed: May 29, 2003

(65) Prior Publication Data

US 2004/0243331 A1 Dec. 2, 2004

(51) Int. Cl.[7] .............................................. G01D 18/00
(52) U.S. Cl. ..................................................... 702/85
(58) Field of Search ...................... 702/85, 92; 250/332, 250/221; 123/339; 701/37; 180/441, 272; 324/426

(56) References Cited

U.S. PATENT DOCUMENTS

| | | | |
|---|---|---|---|
| 5,020,628 A | * | 6/1991 | Bigliardi et al. ............ 180/272 |
| 5,666,917 A | * | 9/1997 | Fraser et al. ............ 123/339.11 |
| 6,157,024 A | * | 12/2000 | Chapdelaine et al. ....... 250/221 |
| 6,338,010 B1 | | 1/2002 | Sparks et al. .................. 701/1 |
| 6,356,851 B1 | * | 3/2002 | Young et al. ................. 702/92 |

* cited by examiner

Primary Examiner—John Barlow
Assistant Examiner—Tung Lau
(74) Attorney, Agent, or Firm—Stefan V. Chmielewski

(57) ABSTRACT

A method of calibrating a vehicle electrical system having a data bus includes transmitting calibration data to a calibration data device, such as a memory card, associated with an electronic device, such as a radio, simultaneous to other vehicle assembly steps; and transferring at least a portion of the calibration data from the electronic device to electronic modules coupled to the data bus upon a triggering event, such as application of electric power to the vehicle electrical system. The electronic device for transferring the calibration data includes a processor capable of being coupled to the data bus and having software capable of performing calibration procedures on the electronic modules, an interface coupled to the processor and the calibration data device and capable of receiving data from the calibration data device, and hardware and/or software for enabling the processor to transfer a portion of the data from the calibration data device through the data bus to enable the software to perform calibration procedures on the electronic modules.

29 Claims, 3 Drawing Sheets

METHOD TO PROVIDE OFF-LINE TRANSFER OF VEHICLE CALIBRATION DATA

TECHNICAL BACKGROUND

The present invention relates generally to automotive electronic systems. More particularly, the present invention relates to a method of transferring calibration data to a plurality of electronic devices installed in a motor vehicle.

BACKGROUND OF THE INVENTION

During the assembly process of a motor vehicle a plurality of electronic devices or modules are often installed. Many of these modules contain processors and on-board memory and are referred to as "smart" modules. Other electronic modules not containing microcontrollers and memory, such as windshield wiper motor assemblies and back-up aid sensors, referred to as "dumb" modules, are electronically connected to smart modules. A data bus is typically used to exchange data between various electronic modules. The combination of smart and dumb modules throughout a motor vehicle add significantly to its performance and enjoyability.

To function properly and to provide the best enjoyment the installed electronic modules often require calibration data specific to the entire vehicle and subsystem configuration. For example, calibration data transferred to the radio in a motor vehicle establishes the best audio equalization based on the type of speakers installed and the interior trim, such as leather or fabric. Calibration data transferred to the engine computer optimizes engine performance based on engine specifications, the installed transmission, emission standards in effect at the targeted destination, wheel and tire size, and other factors. These examples may include only a few bytes out of thousands or millions of bytes of calibration data transferred to electronic modules during the motor vehicle manufacturing process.

Transferring the calibration data to a module is often referred to as "programming." Transferring calibration data to the modules installed in or targeted for a specific motor vehicle generally utilizes one of two processes: individual off-line programming or on-vehicle programming via an external controller.

Individual off-line programming utilizes dedicated process equipment, such as a programming station, located near the installation point of the smart module, or remotely located but sequenced according to the vehicle build schedule established by the motor vehicle assembly plant. In either case, the electronic modules are programmed with calibration data that is typically specific to the targeted vehicle. The programming station is connected to the motor vehicle plant information systems where data resides for each module of each vehicle currently in the assembly process. The programming station retrieves the appropriate data from the motor vehicle plant information systems for the targeted vehicle, then based on the data, programs the electronic modules with vehicle-specific calibration data. The calibrated electronic modules are then physically installed in the targeted motor vehicle.

A second process, on-vehicle programming via an external controller, transfers calibration data to modules already installed in a motor vehicle. The process involves the use of a programming station that is connected to the motor vehicle data bus. The data bus is connected to the electronic modules installed in the motor vehicle. The external controller is functionally similar to the programming station described above. On-vehicle programming often occurs near the end of the motor vehicle assembly process because the electronic modules must be powered and operational to receive the calibration data. Furthermore, the calibration of an electronic module may depend on the presence of other modules and the data contained in the memory of these other modules. The external controller is also connected to the motor vehicle plant information system and acquires the specific calibration data and vehicle options for the targeted vehicle. The external controller also has the capability to poll installed electronic modules for information. The external controller transfers calibration data to targeted electronic modules based on the data gathered from the motor vehicle plant information system and/or other installed modules.

The above programming must be repeated for numerous electronic modules installed in the motor vehicle. The programming process requires time, dedicated programming stations, labor, and often physical length and/or space on the motor vehicle assembly line. Throughput limitations for some programming stations and speed limitations of the vehicle data bus require the use of multiple, yet identical, programming stations.

SUMMARY OF THE INVENTION

The present invention relates to a method of calibrating a vehicle electrical system having a data bus. Calibration data may be transmitted to a calibration data device, such as a memory card, associated with an electronic device, such as a radio, simultaneous to other vehicle assembly steps. At least a portion of the calibration data is transferred from the electronic device to electronic modules coupled to the data bus upon a triggering event, such as application of electric power to the vehicle electrical system. After transfer of the calibration data, the calibration data device may be erased or the calibration data otherwise protected to prevent reuse.

The radio or other electronic device for transferring the calibration data includes a processor capable of being coupled to the data bus and having software capable of performing calibration procedures on the electronic modules, an interface coupled to the processor and the calibration data device and capable of receiving data from the calibration data device, and hardware and/or software enabling the processor to transfer a portion of the data from the calibration data device through the data bus to enable the software to perform calibration procedures on the electronic modules.

A commonly available calibration data device may be used, for example a FLASH memory card such as SmartMedia or Secure Digital, a CD ROM, a hard drive, or other random access media to store the calibration data. Such a calibration data device serves as a carrier of calibration data for the electronic device to which it is coupled and for electronic modules that are coupled to the vehicle data bus. Some vehicle electronic devices, such as radios or navigation systems, already incorporate data storage devices that are already internally or externally coupled and may be utilized for the further purpose of carrying calibration data.

The calibration data device is programmed with the calibration data using one of two methods:

1) The electronic device provides a connector for direct access to the calibration data device for off-line high-speed programming after the calibration data device is coupled to the electronic device.
2) The calibration data device is programmed by an off-line programming station and then is coupled to the electronic device either before or after the electronic device is installed in the vehicle.

With either method, the calibration data device can be shipped with the vehicle to avoid additional handling of components. Furthermore, the electronic device need not be programmed on or near the motor vehicle assembly line, but the electronic device or calibration data device must be sequenced for the target vehicle when shipped to the installation point on the motor vehicle assembly line. Because the calibration data for other electronic modules is carried by the calibration data device coupled to the electronic device, the other electronic modules do not require assembly line sequencing with a target vehicle based on calibration data. Thus, one electronic device utilized as a carrier of the calibration data for all electronic modules installed in a motor vehicle provides for a less complex and less costly process.

A particular type of electronic device, e.g., a radio, navigation system, engine control module, or body control module, may be selected during the design phase to incorporate the required hardware and firmware to implement the present invention. In one embodiment, a data storage device such as FLASH memory or a hard drive not intended for easy removal from the electronic device may be used. The embodiment may include a wired or wireless means for high-speed data transfer to the data storage device. In another embodiment, a port or other data interface may provide for easy coupling and uncoupling of a data storage device with the electronic device.

In some cases, an electronic device to carry the calibration data may not be desirable or economically feasible for a particular vehicle model. Instead, a temporary electronic device may be utilized and coupled to the vehicle electrical system during the assembly process then removed prior to shipment and used again.

In one form thereof, the invention provides an electronic device for a vehicle having an electrical system including a data bus and a plurality of electronic modules, the electronic device including a calibration data device capable of providing calibration data for vehicle electronic modules, a processor capable of being coupled to the data bus, the processor including software capable of performing calibration procedures with at least one of the plurality of electronic modules, and an interface coupled to the processor and the calibration data device and capable of receiving data from the calibration data device.

In another form, the invention provides a vehicle electrical system, including a data bus, a calibration data storage device capable of providing vehicle calibration data, a first electronic module coupled to the data bus and having an interface capable of receiving data from the calibration data device, and a second electronic module coupled to the data bus, the first electronic module having software enabling the first electronic module to provide data received from the calibration data device to the second electronic module via the data bus.

In yet another form, the invention provides a method of calibrating a vehicle electrical system having a data bus coupled to first and second electronic modules having calibration data, including the steps of providing calibration to the first electronic module, and transferring at least a portion of the calibration data from the first electronic module to the second electronic module.

BRIEF DESCRIPTION OF THE DRAWINGS

The present invention will now be described, by way of example, with reference to the accompanying drawings, in which.

Figure 1:
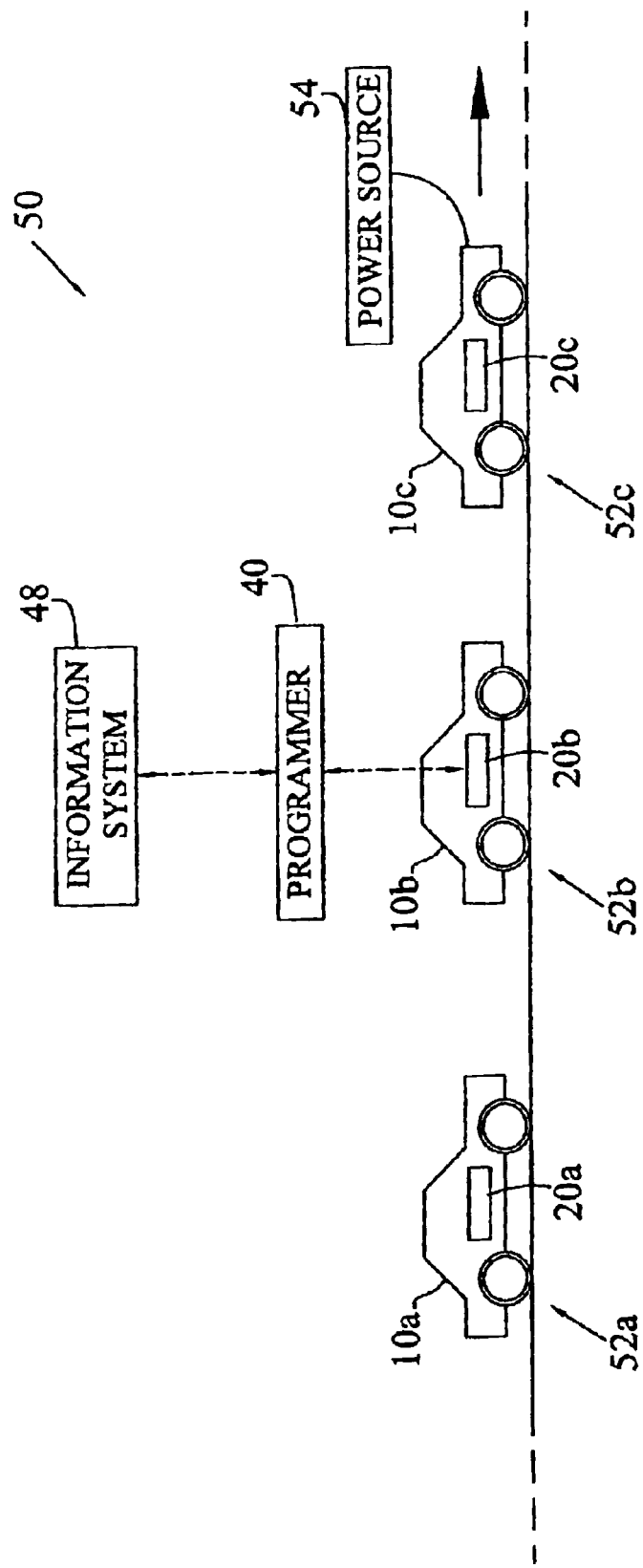
FIG. 1 is a schematic diagram of a portion of a vehicle assembly line according to the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention and such exemplifications are not to be construed as limiting the scope of the invention in any manner.

DESCRIPTION OF INVENTION

The embodiments disclosed below are not intended to be exhaustive or limit the invention to the precise forms disclosed in the following detailed description. Rather, the embodiments are chosen and described so that others skilled in the art may utilize their teachings.

Vehicle assembly line 50, a portion of which is shown in FIG. 1, includes vehicles 10a, 10b, and 10c, being assembled at positions 52a, 52b, and 52c, respectively. Each vehicle 10a–10c includes vehicle electrical system 20a, 20b, and 20c, respectively. During the vehicle assembly process, vehicles progressively proceed from position 52a to position 52b to position 52c.

In position 52a, vehicle 10a includes vehicle electrical system 20a, or a portion thereof, which was installed in earlier assembly line 50 positions (not shown). In assembly position 52b, calibration data for vehicle electrical system 20b of vehicle 10b is provided. Vehicle calibration data is provided by programmer 40, which receives and/or computes vehicle calibration data based on the specific vehicle configuration of vehicle 10b and vehicle electrical system 20b that is provided by vehicle assembly information system 48. In addition to calibration data being provided to vehicle 10b, other vehicle assembly or inspection steps may simultaneously be completed at assembly position 52b.

At assembly position 52c, power source 54 is coupled to vehicle electrical system 20c of vehicle 10c. Upon coupling of power source 54, vehicle electrical system 20c may perform calibration procedures throughout various components of vehicle electrical system 20c. In addition to performing calibration procedures, other vehicle assembly or inspection steps may simultaneously be completed at vehicle assembly position 52c.

Figure 2:
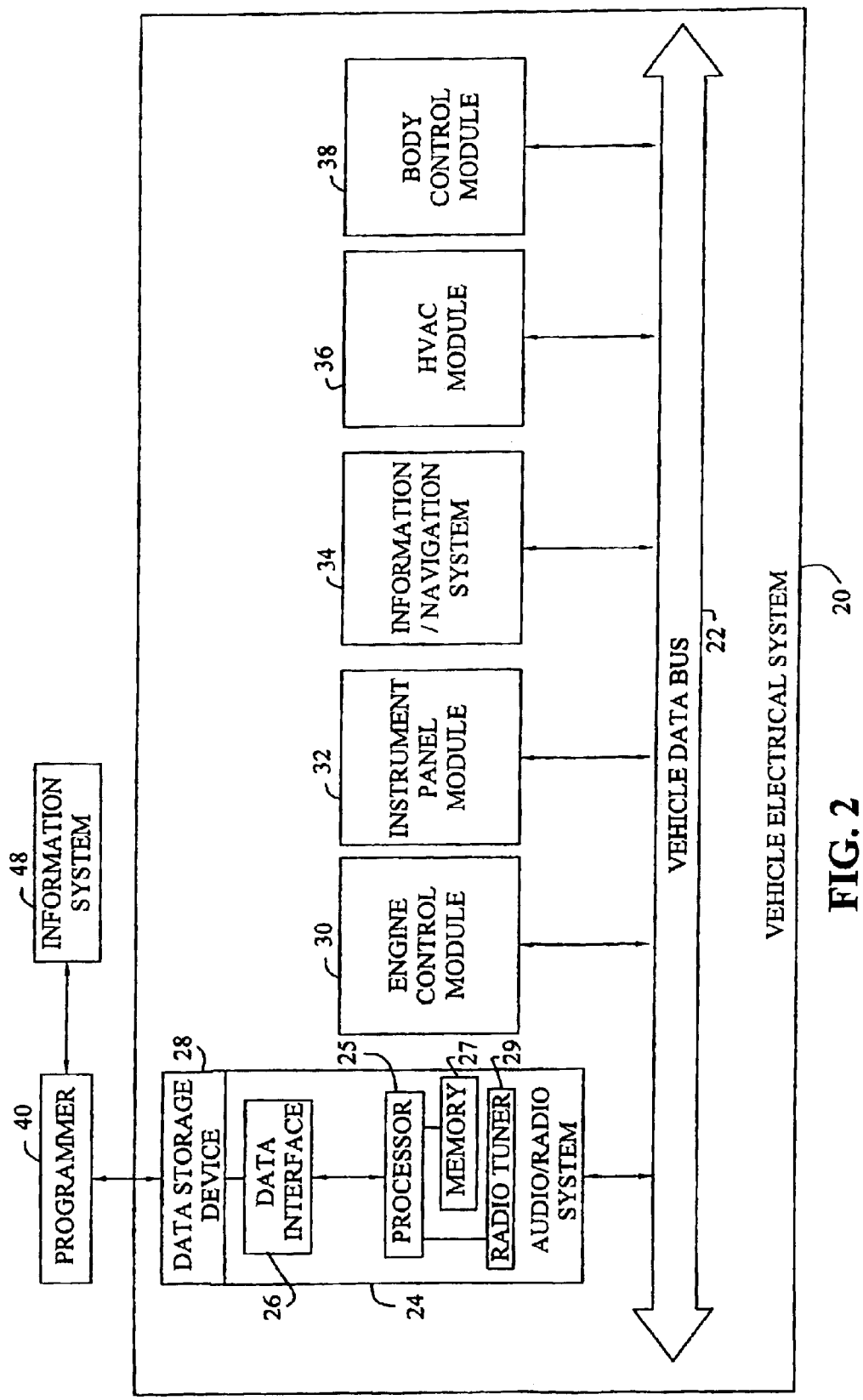
FIG. 2 is a schematic block diagram of a vehicle electrical system according to the present invention.

Referring to FIG. 2, vehicle electrical system 20 includes vehicle data bus 22 to which is coupled various electronic modules and devices, such as radio 24, engine control module 30, instrument panel module 32, information and navigation system 34, HVAC module 36, and body control module 38. The electrical modules and devices shown are exemplary only and vehicle electrical system 20 may include fewer or additional electronic modules and devices coupled to vehicle data bus 22 or to other modules or devices.

One of the electronic devices coupled to vehicle data bus 22 includes hardware and/or software enabling the device to receive calibration data and to transfer the calibration data via vehicle data bus 22 to various electronic modules. In the exemplary embodiment, radio 24 is so configured and transfers calibration data via vehicle data bus 22 to modules 30, 32, 34, 36, and 38. Alternatively, module 30, 32, 34, 36, or 38 may include the hardware and/or software enabling reception and transfer of calibration data.

Vehicle assembly line information system 48 provides information regarding the configuration of each vehicle 10a–c currently in the assembly process on assembly line 50. For a particular vehicle, information system 48 provides to programmer 40 the calibration data or data necessary to determine the calibration data for electronic modules and devices coupled to vehicle data bus 22 of vehicle electrical system 20. The calibration data may be derived from algorithms, data sets, or on-site testing and may include both data and processor execution code.

In the exemplary embodiment shown in FIG. 2, radio 24 is the electrical device coupled to vehicle data bus 22 that receives calibration data and transfers the data to electronic modules 30–38 also coupled to vehicle data bus 22. Radio 24 includes processor 25 which is coupled to data interface 26 and vehicle data bus 22. Processor 25 includes software (not shown) enabling radio 24 to perform calibration procedures, such as transferring calibration data, directly with electronic modules 30–38. Data interface 26 is capable of receiving calibration data and interfaces calibration data device 28 to processor 25. Calibration data device 28 is capable of receiving, storing, and transmitting calibration data and may be, for example, a FLASH memory card such as SmartMedia or Secure Digital, a CD ROM, hard drive, or other random access media.

Calibration data is received by calibration data device 28 from programmer 40. The transfer of the calibration data may occur by coupling calibration data device 28 directly with programmer 40 via a wireless or hardware connection, either before or after calibration data device 28 is coupled to radio 24. Additionally, depending on the type of device used and other manufacturing and electrical system considerations, calibration data device 28 may be coupled with radio 24 either before or after radio 24 is coupled with vehicle electrical system 20.

In the exemplary embodiment, radio 24 includes radio tuner 29 coupled to processor 25 and may include memory 27 coupled to processor 25. Memory 27 may be used for storage of a portion of the calibration data for radio 24 and/or electronic modules 30–38 that is transferred from data storage device 28. In the exemplary embodiment, radio 24 is capable of transferring the calibration data via vehicle data bus 22 to electronic modules 30–38. The transfer of calibration data may occur, for example, after radio 24 detects a trigger event, such as application of electric power to vehicle electrical system 20.

By utilizing calibration data device 28 and radio 24 to carry and control transfer of calibration data, many advantages are achieved. For example, transmittal of calibration data from programmer 40 to calibration data device 28 and the transferring of calibration data from calibration data device 28 to electronic modules 30–38 may flexibly be disassociated with a specific assembly line position 52a–c. Thus, transmitting and transfer of calibration data may be performed simultaneous with other vehicle assembly or inspection steps, advantageously reducing the time, dedicated programming stations, labor, and physical space on the motor vehicle assembly line required for calibration of vehicle electric system 20.

Figure 3:
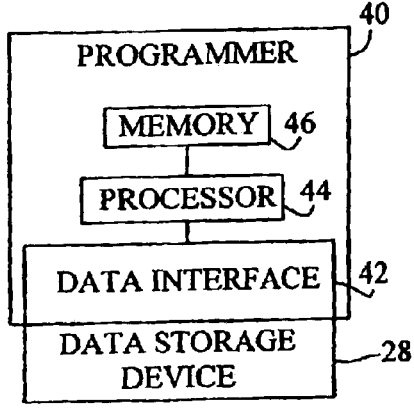
FIG. 3 is a schematic block diagram of a vehicle electronic device programmer according to the invention.

Referring to FIG. 3, programmer 40, which is coupled to information system 48 (FIG. 2), includes memory 46 and processor 44 for receiving and/or determining calibration data for specific target vehicles based on vehicle configuration. Programmer 40 also includes data interface 42, which is coupled to processor 44, to which calibration data device 28 may be coupled for receiving the calibration data. Alternatively, if the calibration data is transmitted to calibration data device 28 after calibration data device 28 is coupled to radio 24, data interface 42 may be coupled to another component of radio 24, such as data interface 26 (FIG. 2). Coupling of information system 48 to programmer 40 and of programmer 40 to calibration data device 28 or radio 24 may be via wireless or wired data communication connections.

Referring again to FIG. 2, instead of utilizing radio 24 as described in the exemplary embodiment for receiving and transferring calibration data, another electronic device or module may be used instead. For example, a temporary electronic device may be utilized which is coupled to the vehicle data bus 22 during the vehicle assembly process, and removed and reused for another vehicle after calibration data is transferred to radio 24 and electronic modules 38—38 via vehicle data bus 22.

Similarly, calibration data device 28 may be data storage media that remains coupled with radio 24, or another electronic device, or that is uncoupled after the calibration data is transferred via vehicle data bus 22 and then used for the calibration of other vehicles. After the assembly process and delivery of a calibrated vehicle, a service center or other authorized person can recalibrate vehicle electrical system 20 in a manner similar to the above-described methods used on vehicle assembly line 50.

In order to prevent unauthorized reuse of calibration data stored by calibration data device 28, a portion or all of the calibration data may be erased from calibration data device 28. For example, for electronic media the calibration data may be electronically purged or overwritten with arbitrary or null data. Alternatively, calibration data may be protected from use. For example, the calibration data may be encrypted and require a key for decryption, or access restricting hardware or software may be included in calibration data device 28 or radio 24 that keys the calibration data or device 28 to a code stored in the particular radio 24 or other electronic module, thus preventing access by and data transfer to other radios 24 or electronic modules 30–38.

Figure 4:
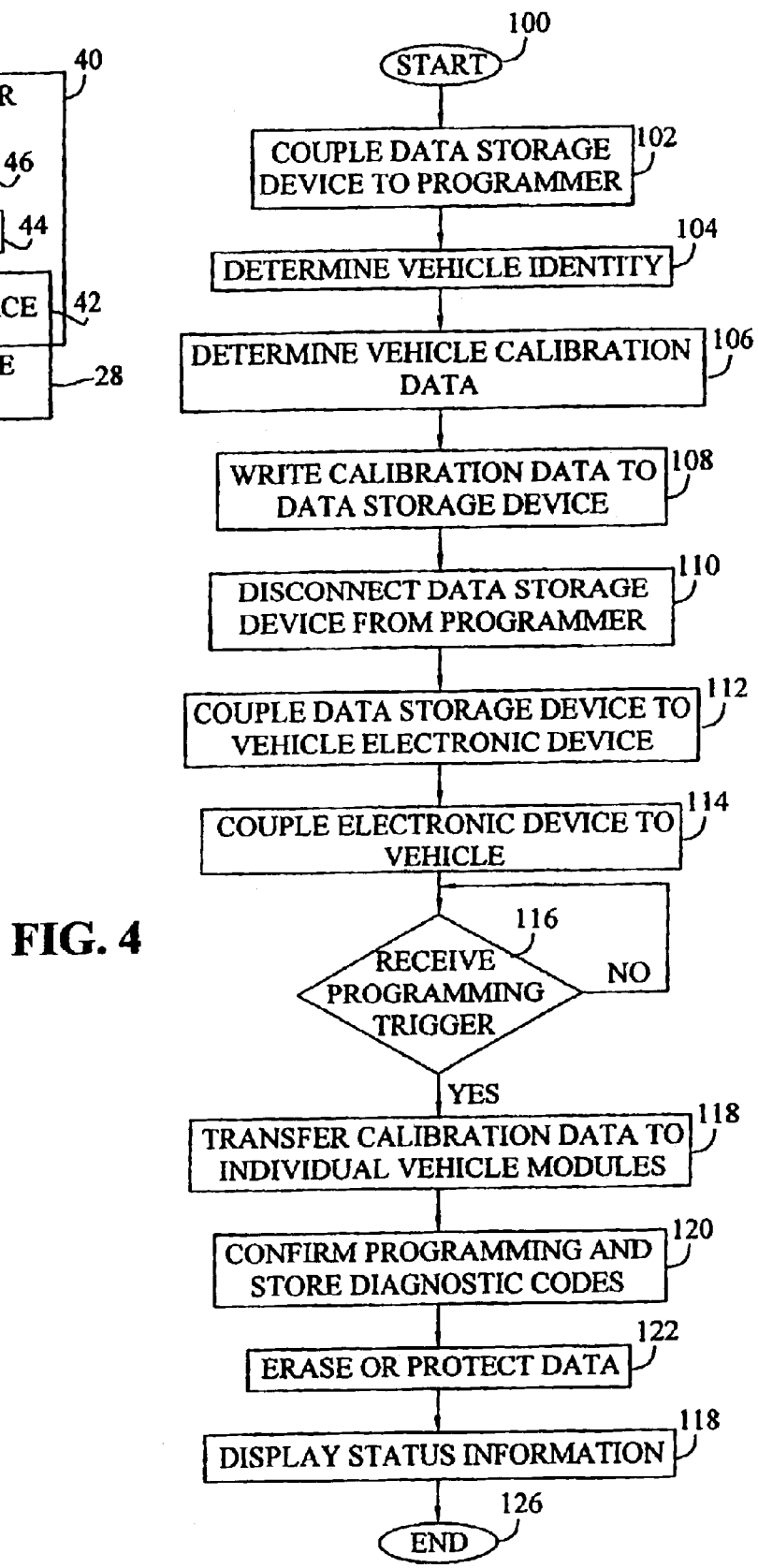
FIG. 4 is a flowchart depicting a method of calibrating a vehicle electrical system according to the present invention.

Method 100 for calibrating vehicle electrical system 20 is shown in FIG. 4. In step 102, calibration data device 28 (FIG. 2) is coupled to programmer 40. In step 104, programmer 40 and information system 48 determine the vehicle identity and configuration associated with vehicle 10b (FIG. 1) targeted for calibration data device 28 that is coupled with programmer 40.

In step 106, a combination of or one of processor 44 of programmer 40 (FIG. 3) and information system 48 (FIG. 2) determines the calibration data for the targeted vehicle 10b (FIG. 1). In step 108, programmer 40 transfers the calibration data via data interface 42 to calibration data device 28. In step 110, calibration data device 28 is disconnected from programmer 40.

In step 112, calibration data device 28 (FIG. 2) is coupled to the electronic device, radio 24 in the exemplary embodiment. Alternatively, step 112 may be completed before step 102. In step 114, the electronic device is coupled to vehicle electrical system 20 of the vehicle. Alternatively, step 114 may also be completed before step 102. In step 116, processor 25 of radio 24 determines whether a triggering event, such as application of electrical power to vehicle electrical system 20, has occurred. If not, method 100 continues at step 116, else step 118 is completed.

In step 118, processor 25 of radio 24 (FIG. 2) transfers the calibration data to individual vehicle electronic modules 30–38 via vehicle data bus 22. In step 120, processor 25 confirms the calibration of electronic modules 30–38 and stores diagnostic codes relating to successful or unsuccessful calibration. In step 122, processor 25 erases or protects from access calibration data stored in calibration data device 28.

In step 124, processor 25 displays status information relating to the calibration process. For example, the diagnostic codes may be displayed on a display associated with radio 24, or the vehicle's hazard flashers could be activated if calibration is unsuccessful. In step 126, method 100 is completed.

Although described in the exemplary embodiments, it will be understood that various modifications may be made to the subject matter without departing from the intended and proper scope of the invention. Accordingly, it will be understood that other audio devices incorporating an embodiment of the audio system and methods device may fall within the scope of this invention, which is defined by the appended claims.

What is claimed is:

1. An electronic device for a vehicle having an electrical system including a data bus and a plurality of electronic modules, the electronic device comprising:

a calibration data device capable of providing calibration data for vehicle electronic modules;

a processor capable of being coupled to the databus, said processor including software capable of performing calibration procedures with at least one of the plurality of electronic modules;

an interface coupled to said processor and said calibration data device and capable of receiving data from said calibration data device; and means for enabling said processor to transfer a portion of the data from said calibration data device through the data bus to enable said software to perform a specific calibration procedure on at least one of the plurality of electronic modules, wherein the portion of data in said data calibration device is protected from reuse after transfer of the portion of the data.

2. The electronic device of claim 1, wherein said means for enabling includes hardware.

3. The electronic device of claim 1, wherein said means for enabling said processor includes software.

4. The electronic device of claim 1, further comprising a radio tuner coupled to said processor.

5. The electronic device of claim 1, wherein said means for enabling also enables said processor to erase at least a portion of the data in said calibration data device.

6. The electronic device of claim 1, wherein said enabling means enables said processor to detect a triggering event and to transfer the portion of data to at least one of the plurality of electronic modules upon the triggering event.

7. The electronic device of claim 6, wherein said triggering event includes application of electric power to the vehicle.

8. The electronic device of claim 1, wherein said calibration data device includes a memory card.

9. The electronic device of claim 1, wherein said calibration data device includes random access media.

10. The electronic device of claim 1, further comprising a data connection coupled to said calibration data device, said data connection capable of receiving data for storage in said calibration data device and bypassing said processor.

11. A vehicle electrical system, comprising:

a databus;

a calibration data device capable of providing vehicle calibration data, wherein said calibration data device includes random access media;

a first electronic module coupled to said databus and having an interface capable of receiving data from said calibration data device; and a second electronic module coupled to said databus;

said first electronic module having software enabling said first electronic module to provide data received from said calibration data device to said second electronic module via said databus.

12. The vehicle electrical system of claim 11, wherein said software enables said first electronic module to provide calibration data for said second electronic module.

13. The vehicle electrical system of claim 11, wherein said calibration data device includes a memory card.

14. The vehicle electrical system of claim 11, wherein said first electronic module is capable of erasing at least a portion of the calibration data stored in said calibration data device.

15. The vehicle electrical system of claim 11, wherein at least a portion of the data stored in said calibration data device is protected from reuse after the data is provided to said second electronic module.

16. The vehicle electrical system of claim 11, wherein said software further enables said first electronic module to detect a triggering event and provide data to said second electronic module upon detecting the triggering event.

17. The vehicle electrical system of claim 16, wherein said software is capable of detecting a triggering event that includes application of electrical power to the vehicle electrical system.

18. A method of calibrating a vehicle electrical system having a databus coupled to first and second electronic modules having calibration data, comprising the steps of:

providing calibration data to the first electronic module; and transferring at least a portion of the calibration data from the first electronic module to the second electronic module, wherein the step of transferring at least a portion of the calibration data is completed simultaneous with another vehicle assembly or inspection step.

19. The method of claim 18, wherein the step of transferring at least a portion of the calibration data is completed upon the occurrence of a triggering event.

20. The method of claim 19, wherein the triggering event includes application of electrical power to the electrical system.

21. The method of claim 18, further comprising the step of verifying receipt of calibration data by the second electronic module.

22. The method of claim 18, further comprising the step of receiving the calibration data from an information system into a data programming device, wherein the calibration data is based on vehicle characteristics.

23. The method of claim 18, further comprising the step of computing in a data programming device at least a portion of the calibration data.

24. The method of claim 18, further comprising the steps of:

providing calibration data to a calibration data device; and coupling the calibration data device to the first electronic module.

25. The method of claim 24, wherein the step of coupling the calibration data device to the first electronic module occurs before the first electronic module is coupled to the vehicle electrical system.

26. The method of claim 24, wherein the step of coupling the calibration data device is completed prior to the step of providing calibration data.

27. The method of claim 24, wherein the step of providing calibration data is completed simultaneous with another vehicle assembly or inspection step.

28. The method of claim 24, further comprising the step of erasing at least a portion of the calibration data stored in the calibration data device.

29. The method of claim 24, further comprising the step of protecting at least a portion of the calibration data stored in the calibration data device from reuse.

* * * * *